No. 761,167. PATENTED MAY 31, 1904.
J. F. HARDY.
GOVERNOR FOR SOUND REPRODUCING MACHINES.
APPLICATION FILED SEPT. 4, 1903.
NO MODEL.
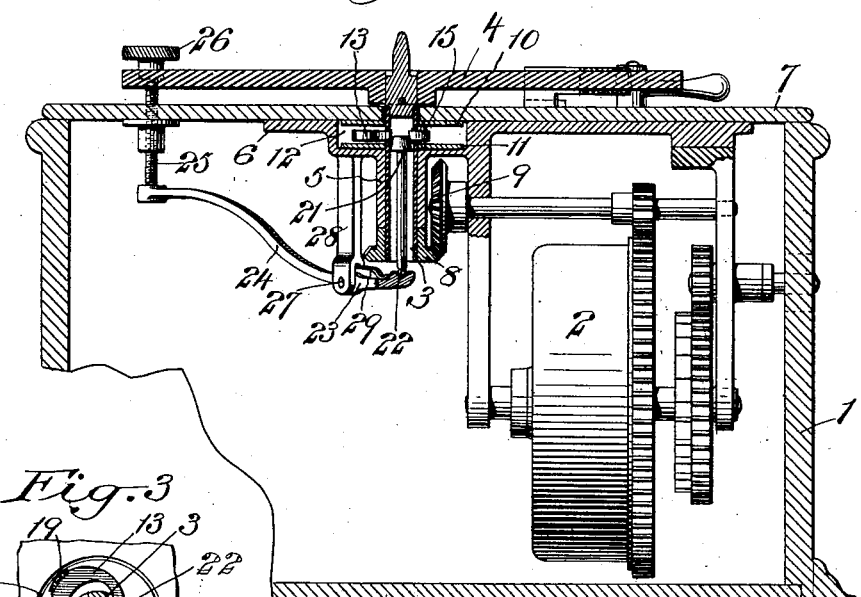
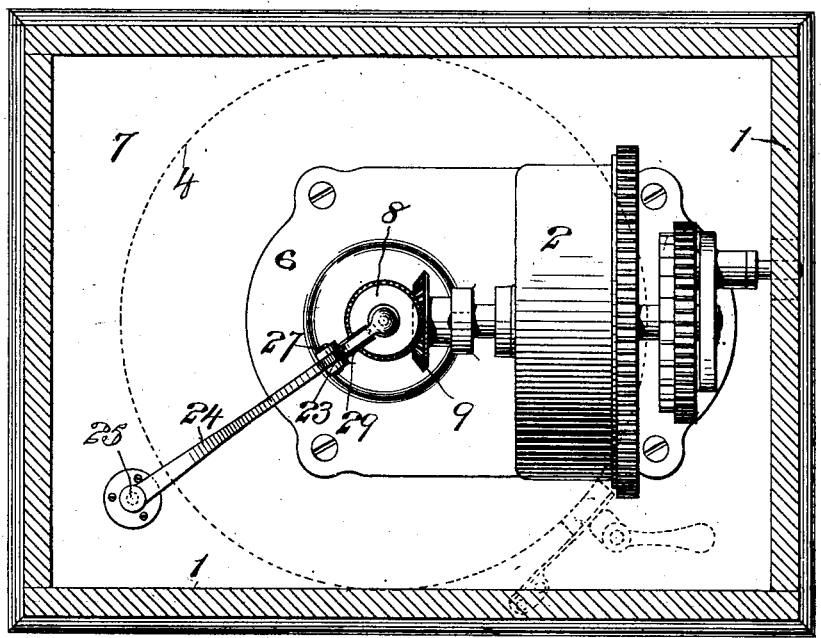
Witnesses:-
George Barry Jr.
Henry Thieme
Inventor-
James F. Hardy
by attorneys Brown & Seward No. 761,167.

Patented May 31, 1904.

UNITED STATES PATENT OFFICE.

JAMES F. HARDY, OF NEW YORK, N. Y.

GOVERNOR FOR SOUND-REPRODUCING MACHINES.

SPECIFICATION forming part of Letters Patent No. 761,167, dated May 31, 1904.

Application filed September 4, 1903. Serial No. 171,910. (No model.)

*To all whom it may concern:*

Be it known that I, JAMES F. HARDY, a citizen of the United States, and a resident of the borough of Manhattan, in the city and State of New York, have invented a new and useful Improvement in Governors for Sound-Reproducing Machines, of which the following is a specification.

My invention relates to an improvement in governors for sound-reproducing machines, and has for its object to provide very simple and effective means for regulating the speed of the table-shaft.

A practical embodiment of my invention is represented in the accompanying drawings, in which—

Figure 1 represents in vertical section so much of a sound-reproducing machine as will give a clear understanding of the operation of my improved governor therefor. Fig. 2 is an inverted horizontal section of the same, and Fig. 3 is a detail transverse section through the governor proper and its adjacent parts.

The box or casing of the sound-reproducing machine is denoted by 1, and it may be provided with the usual motor 2 for driving the table-shaft 3 and its disk-supporting table 4. This shaft 3 is made hollow and is mounted in suitable bearings 5 in a bracket 6, secured to the bottom of the cover 7 of the box or casing 1. This hollow table-shaft 3 is provided at its open lower end with a gear 8, which intermeshes with the gear 9 of the motor 2.

The hollow table-shaft 3 is provided with upper and lower disks 10 and 11, located within a cylindrical recess 12 in the shaft-hanger bracket 6.

A speed-governor is carried by the hollow table-shaft as follows: Two speed-governor wings 13 and 14 are hinged between the disks 10 and 11 and are provided with inwardly-projected tailpieces 15 16, which are fitted to extend into the interior of the shaft 3 through openings 17 18 in the walls of the shaft between the said disks. The wings 13 14 are provided with leather buffers 19 20 to reduce the liability of noise owing to the weighted ends of the wings striking the peripheral wall of the recess 12 when the shaft is being driven by the motor.

The means which I have shown for regulating the governor is constructed, arranged, and operated as follows: A cone 21 is located within the shaft 3 in position to engage the tailpieces 15 16 of the wings 13 14 with greater or lesser friction as the cone is adjusted vertically. This cone 21 is provided with a stem 22, which projects beyond the lower open end of the hollow shaft 3 and rests in engagement with the short arm 23 of a two-armed rocking lever, the long arm 24 of which is engaged by an adjusting-screw 25, the handle 26 of which is exterior to the box or casing 1 of the machine. This rocking lever 23 24 is hinged at 27 to an arm 28, which depends from the hanger-bracket 6, which supports the table-shaft 3. A spring 29 is secured to the arm 28 and presses downwardly upon the short arm 23 of the rocking lever, tending to hold the cone 21 at the limit of its downward movement.

The governor for the shaft is operated as follows: When it is desired to reduce the speed of the shaft and thereby the table, the cone is raised by screwing down the adjusting-screw 25. This will cause the tailpieces of the wings to press with greater friction against the cone 21, and thereby slow the shaft 3 down.

It is evident that changes might be resorted to in the form, construction, and arrangement of the several parts without departing from the spirit and scope of my invention. Hence I do not wish to limit myself strictly to the structure herein set forth; but

What I claim is—

1. In a sound-reproducing machine, a hollow table-shaft, means for driving it, speed-governor wings hinged to the shaft, a cone within the shaft and means for adjusting the cone longitudinally to cause it to engage the wings with greater or lesser friction to regulate the speed of the shaft.

2. In a sound-reproducing machine, a hollow table-shaft, means for driving it, speed-governor wings hinged to the shaft having inwardly-projecting tailpieces, a cone within the shaft and means for adjusting the cone longitudinally to cause it to engage the tailpieces of the wings with greater or lesser friction for regulating the speed of the shaft.

3. In a sound-reproducing machine, a hollow table-shaft, means for driving it, speed-governor wings hinged to the shaft, a cone within the shaft for engaging the wings and means for adjusting the cone longitudinally comprising the cone-stem, a rocking lever having one arm engaging the cone-stem and an adjusting-screw engaging the other arm of the rocking lever.

4. In a sound-reproducing machine, a hollow table-shaft, means for driving it, speed-governor wings carried by the shaft, a cone within the shaft for engaging said wings and means for adjusting the cone longitudinally to regulate the speed of the shaft comprising a rocking lever, a cone-stem engaging one arm thereof, an adjusting-screw engaging the other arm thereof and a spring arranged to normally hold the lever and cone at the limits of their movement in one direction.

5. In a sound-reproducing machine, a hollow table-shaft having disks thereon, governor-wings hinged between the disks and having tailpieces fitted to project into the interior of the shaft, means for driving the shaft and a vertically-adjustable cone within the shaft arranged to engage the said tailpieces for regulating the speed of the shaft.

In testimony that I claim the foregoing as my invention I have signed my name, in presence of two witnesses, this 28th day of August, 1903.

JAMES F. HARDY.

Witnesses:
   FREDK. HAYNES,
   HENRY THIEME.